(12) United States Patent
Hudson

(10) Patent No.: US 11,851,636 B2
(45) Date of Patent: Dec. 26, 2023

(54) SOAP BAR MOLDING DEVICE

(71) Applicant: Howard Hudson, Euclid, OH (US)

(72) Inventor: Howard Hudson, Euclid, OH (US)

( * ) Notice: Subject to any disclaimer, the term of this patent is extended or adjusted under 35 U.S.C. 154(b) by 0 days.

(21) Appl. No.: 17/737,784

(22) Filed: May 5, 2022

(65) Prior Publication Data

US 2023/0357676 A1    Nov. 9, 2023

(51) Int. Cl.
*C11D 13/16* (2006.01)
*B29C 33/08* (2006.01)
*B29K 105/26* (2006.01)

(52) U.S. Cl.
CPC ............ *C11D 13/16* (2013.01); *B29C 33/08* (2013.01); *B29K 2105/26* (2013.01)

(58) Field of Classification Search
CPC ... C11D 13/16; C11D 13/30; B29L 2031/762; B29K 2105/26; B29C 33/34
See application file for complete search history.

(56) References Cited

U.S. PATENT DOCUMENTS

| 4,030,867 A | 4/1977 | Everman |
| 5,876,769 A | 3/1999 | Dowden |
| 2015/0008620 A1 | 1/2015 | Welcome |
| 2015/0216368 A1 | 8/2015 | McClendon |
| 2017/0015957 A1 | 1/2017 | Jones |
| 2018/0162015 A1* | 6/2018 | Hinton ............... C11D 13/00 |
| 2020/0070386 A1* | 3/2020 | Green ................. C11D 13/12 |

FOREIGN PATENT DOCUMENTS

| CN | 206486496 U | * | 9/2017 |
| KR | 20140121066 A | * | 10/2014 |
| KR | 20170142569 A | * | 12/2017 |

* cited by examiner

*Primary Examiner* — Michael M. Robinson
*Assistant Examiner* — Victoria Bartlett

(57) ABSTRACT

A soap bar molding device for molding recycled soap bars includes a housing having a top surface and a bottom surface. Additionally, the housing has a front surface, a back surface, and an interior. A bottom plate is positioned on the top surface of the house and protruding inward therefrom. The bottom plate holds a plurality of soap pieces. An interior surface of a cover is positioned upon the top surface of the housing. A top plate is positioned on the interior surface of the cover. An exterior surface of the cover has a dish defining a space to hold a bar of soap. A power source is positioned within the interior of the housing. A button is positioned on the front surface of the housing and provides electric current from the power source to the bottom plate and the top plate wherein the bottom and top plates generate heat.

11 Claims, 4 Drawing Sheets

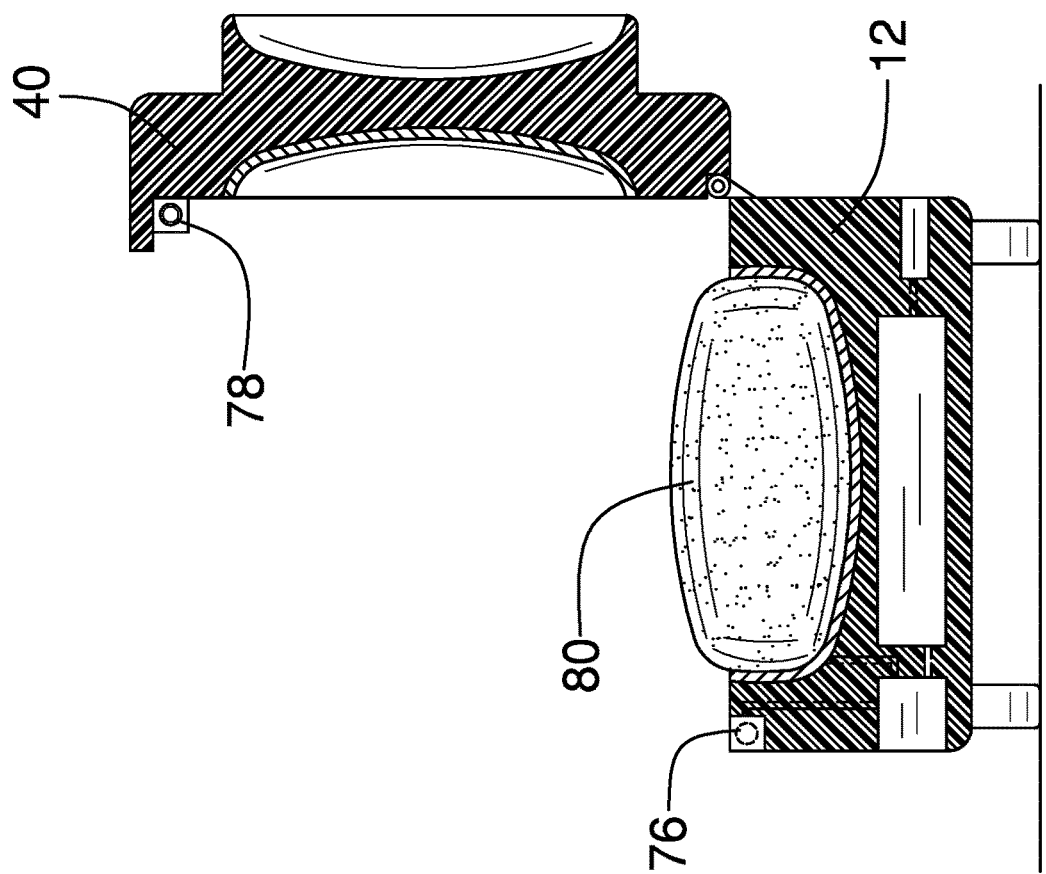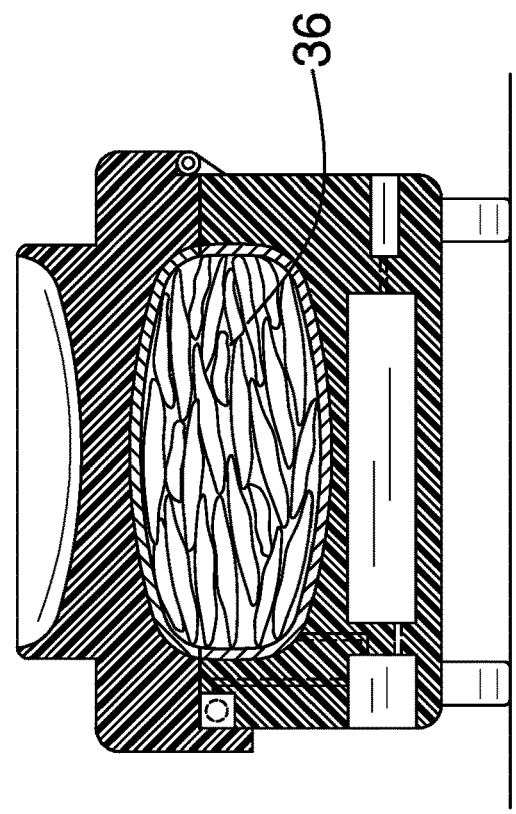

SOAP BAR MOLDING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention.

The disclosure relates to heated molding devices and more particularly pertains to a new heated molding device for molding recycled soap bars.

(2) Description of Related Art Including Information Disclosed Under 37 CFR 1.97 and 1.98.

The prior art relates to heated molding devices. The prior art relates to a variety of heated molding devices having a cavity to hold the substance being molded. Known prior art lacks a heated molding device configured for molding recycled soap bars to create a new soap bar to be stored in a dish upon the device.

BRIEF SUMMARY OF THE INVENTION

An embodiment of the disclosure meets the needs presented above by generally comprising a housing having a top surface and a bottom surface. Additionally, the housing has a front surface and a back surface. Furthermore, the housing has an interior. The top surface of the housing has a front edge and a back edge. A bottom plate is positioned on the top surface of the house and protruding inward therefrom. The bottom plate is configured for holding a plurality of soap pieces. An interior surface of a cover is configured for being positioned upon the top surface of the housing. A top plate is positioned on the interior surface of the cover. An exterior surface of the cover has a dish. The dish defines a space to hold a bar of soap. A power source is positioned within the interior of the housing. A button is positioned on the front surface of the housing. The button is configured for providing electric current from the power source to the bottom plate and the top plate wherein the bottom and top plates generate heat.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 5 is a cross-sectional view of an embodiment of the disclosure.

FIG. 6 is a cross-sectional view of an embodiment of the disclosure.

DETAILED DESCRIPTION OF THE INVENTION

Figure 1:
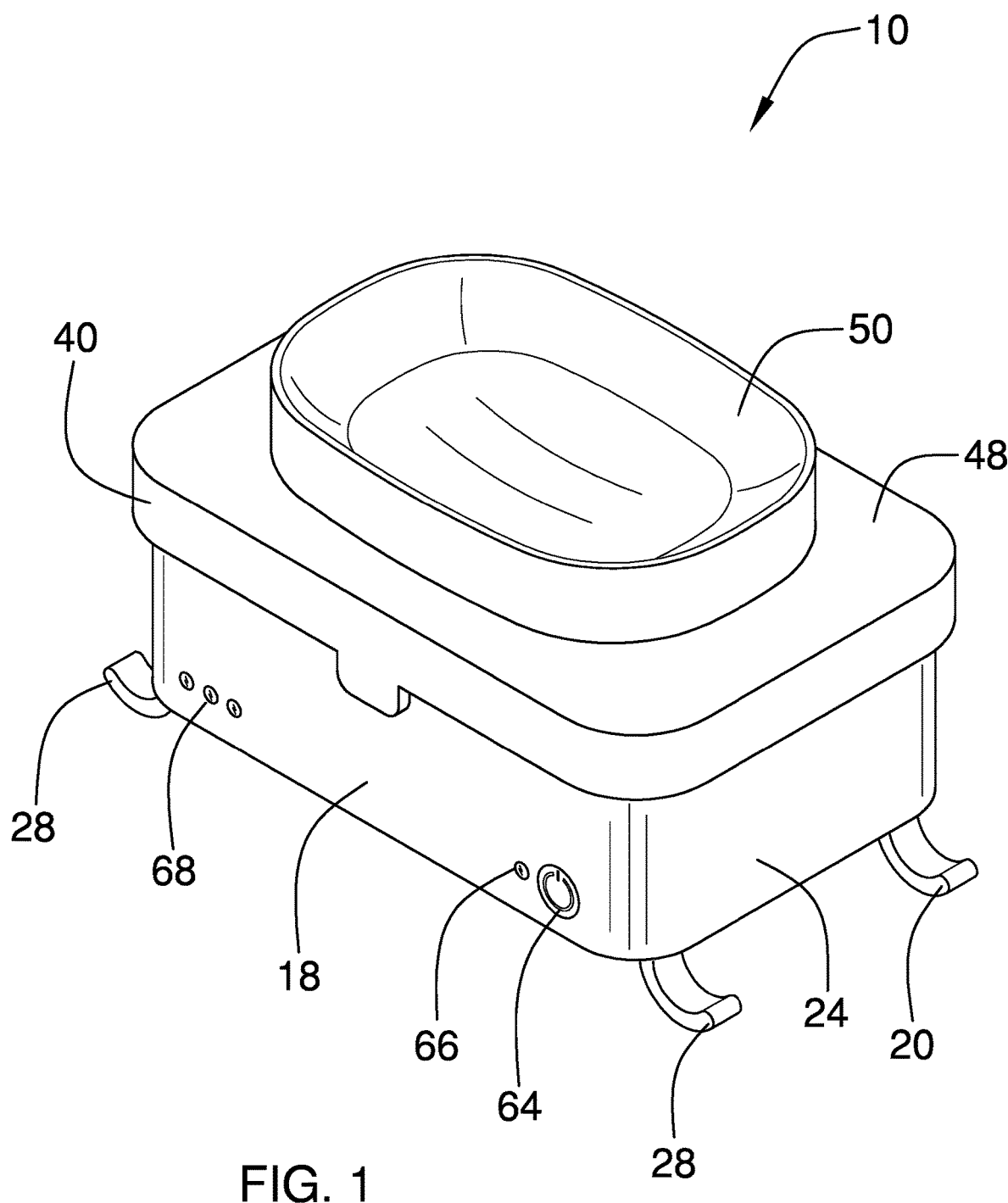
FIG. 1 is a front isometric view of a soap bar molding device according to an embodiment of the disclosure.
Figure 2:
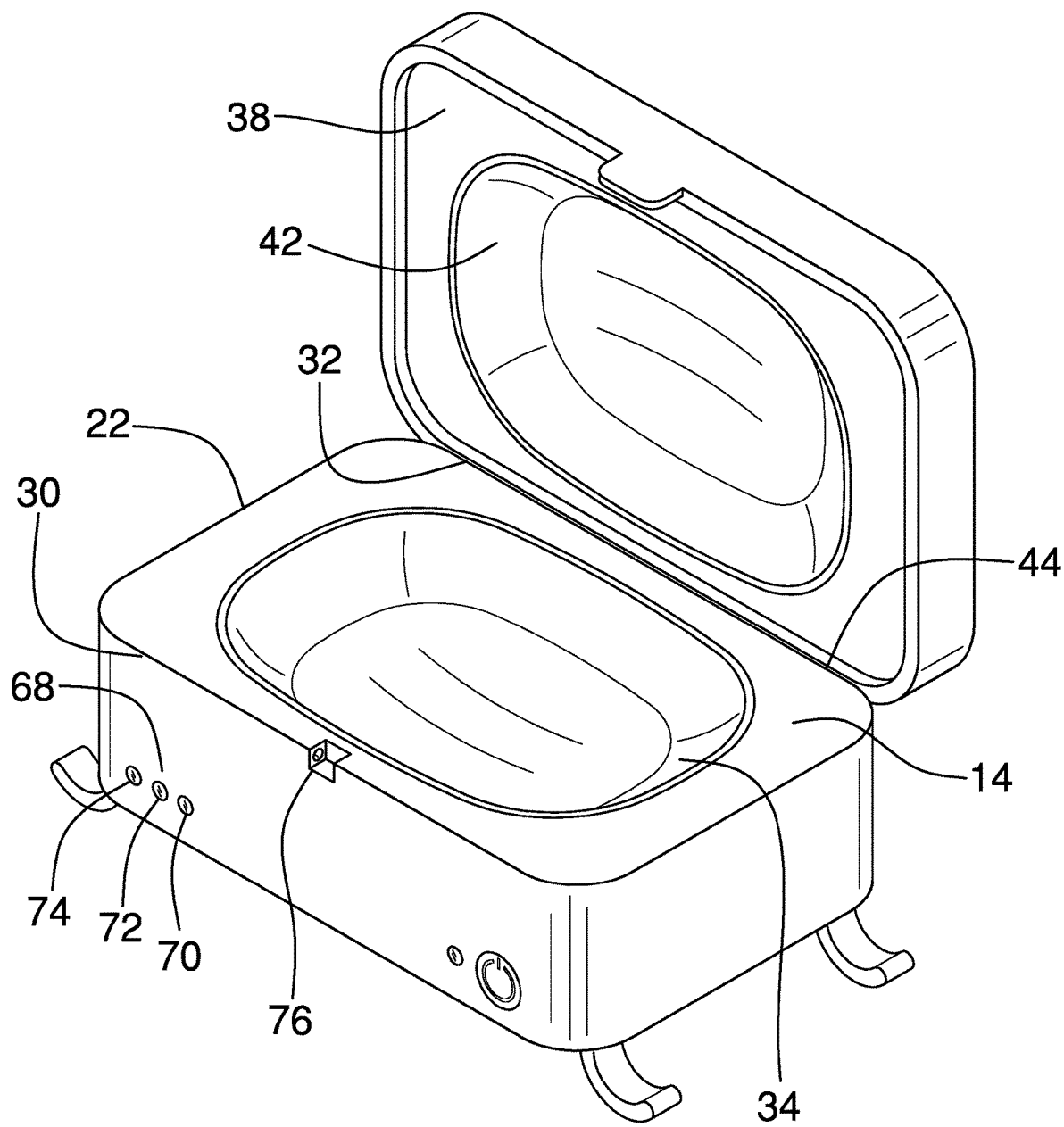
FIG. 2 is an isometric view of an embodiment of the disclosure.
Figure 3:
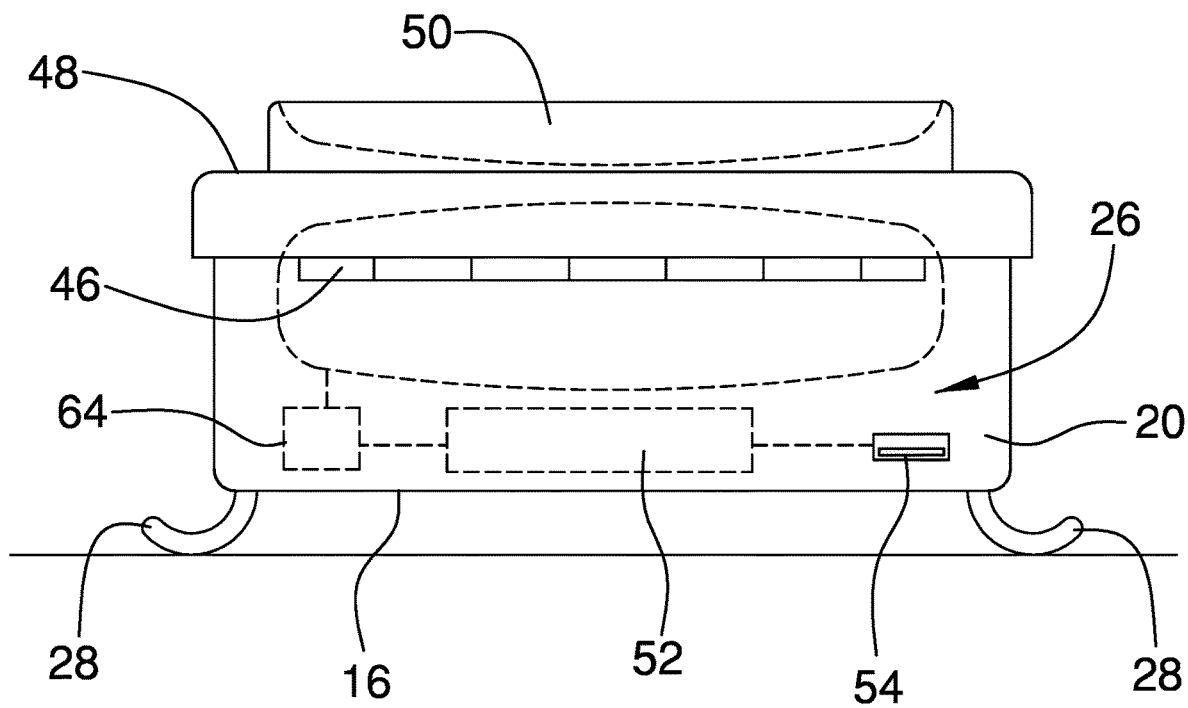
FIG. 3 is a rear view of an embodiment of the disclosure.
Figure 4:
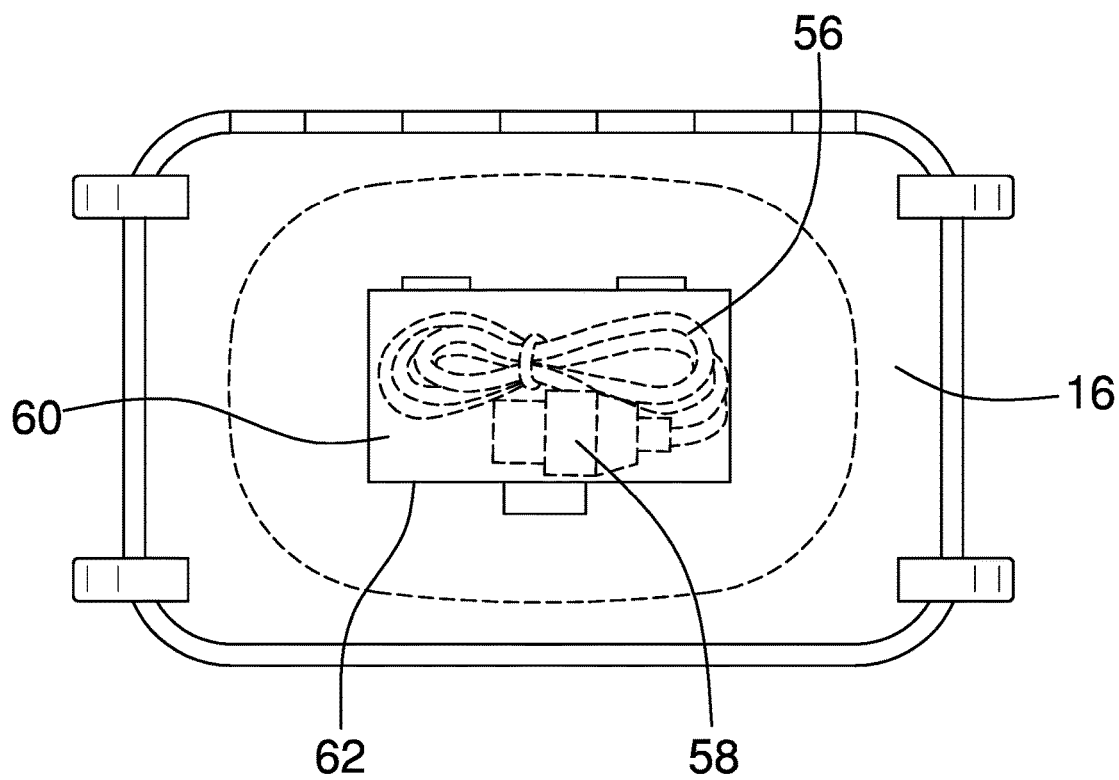
FIG. 4 is a bottom view of an embodiment of the disclosure.

With reference now to the drawings, and in particular to FIGS. 1 through 6 thereof, a new heated molding device embodying the principles and concepts of an embodiment of the disclosure and generally designated by the reference numeral 10 will be described.

As best illustrated in FIGS. 1 through 6, the soap bar molding device 10 generally comprises a housing 12. The housing 12 has a top surface 14 and a bottom surface 16. In addition, the housing 12 has a front surface 18 and a back surface 20. The housing 12 also has a left surface 22 and a right surface 24. The front 18 and back 20 surfaces are positioned perpendicular relative to the left 22 and right 24 surfaces. Furthermore, the top 14 and bottom 16 surfaces are positioned parallel relative to each other and perpendicular relative to the front 18 and back 20 surfaces. The arrangement of the surfaces of the housing 12 creates an interior 26 within the housing 12. The interior 26 defines a space for a variety of elements to be positioned within.

A plurality of feet 28 is positioned on the bottom surface 16 of the housing 12. The plurality of feet 28 provides support to the housing 12 when resting on a surface. The top surface 14 of the housing 12 has a front edge 30 and a back edge 32. Positioned between the front 30 and back 32 edges is a bottom plate 34. The bottom plate 34 protrudes inward and has a concave shape. The bottom plate 34 is configured for holding a plurality of soap pieces 36. Furthermore, an interior surface 38 of a cover 40 is configured for being positioned upon the top surface 14 of the housing 12. A top plate 42 is positioned on the interior surface 38 of the cover 40. The top plate 42 is complementary to the bottom plate 34 of the housing 12, thus the top plate 42 assists in holding the plurality of soap pieces 36 within the bottom plate 34.

A rear edge 44 of the interior surface 38 of the cover 40 is coupled to the back edge 32 of the top surface 14 of the housing 12 by a hinge 46. The hinge 46 is configured for positioning the cover 40 in an open and closed position relative to the housing 12. Additionally, an exterior surface 48 of the cover 40 has a dish 50. The dish 50 defines a space to hold a bar of soap. The dish 50 has an oval shape and can hold an existing bar of soap, or the dish 50 can hold a bar of soap formed from the bottom 34 and top plates 42 of the housing 12.

A power source 52 is positioned within the interior 26 of the housing 12. The power source 52 is rechargeable and is in electric communication with a universal serial bus port 54. The universal serial bus port 54 is positioned on the back surface 20 of the housing 12. A cord 56 is configured for providing electricity to the power source 52. The cord 56 has a universal serial bus input 58 configured for being inserted into the universal serial bus port 54. The cord 56 can also have an outlet plug to receive the electric current from a power outlet. A compartment 60 is positioned on the bottom surface 16 of the housing 12 and is configured for storing the cord 56 within when the cord 56 is un-used. The compartment 60 has a door 62 configured for enclosing the compartment 60.

A button 64 is positioned on the front surface 18 of the housing 12. The button 64 is an actuator configured for providing electric current from the power source 52 to the bottom plate 34 and the top plate 42 wherein the bottom 34 and top 42 plates generate heat. When the button 64 is in an on position, the bottom 34 and top 42 plates generate heat and liquefy the plurality of soap pieces 36. The plurality of soap pieces 36 combine into a unified liquid. A power light 66 positioned proximate to the button 64 on the front surface 18 is in electric communication with the button 64. The power light 66 is configured for emitting either a green or red color to indicate the completion status of heating the plurality of soap pieces 36 within the bottom 34 and top 42 plates. The red color indicates the process of heating is active, wherein the green color indicates the process is complete.

A plurality of lights 68 is positioned on the front surface 18 of the housing 12. The plurality of lights 68 is in electric communication with the power source 52. Each of the lights 68 is configured for emitting a respective one of a red color 70 and an orange color 72 and a green color 74. The plurality of lights 68 is configured for emitting a specific one light relative to the level of electricity within the power source 52. The green light 74 would signify a large amount of electricity within the power source 52. The orange light 72 would signify a medium amount of electricity within the power source 52, thus suggesting providing more electricity to the power source 52. The red light 70 would signify a low amount of electricity within the power source 52, thus suggesting the necessity of providing more electricity to the power source 52.

A lock 76 is positioned on the front edge 30 of the top surface 14 of the housing 12. The lock 76 is complementary to a latch 78 positioned on the interior surface 38 of the cover 40. The lock 76 is a solenoid configured for fastening to the latch 78 when the button 64 is in the on position. The lock 76 is in electric communication with the button 64. When the power light 66 emits a green light indicating the heating process of a solid bar of soap 80 being complete, the lock 76 will unfasten from the latch 78 of the cover 40.

In use, the user can place the plurality of soap pieces 36 within the bottom plate 34 of the housing 12. Once the bottom plate 34 is loaded with enough soap pieces 36, the cover 40 can be positioned upon the housing 12 and the button 64 can be pressed to begin the heating process. The lock 76 will fasten the cover 40 to the housing 12, and the bottom 34 and top 42 plates will begin to heat the plurality of soap pieces 36 thus creating a unified liquid. Once the unified liquid is formed, the bottom 34 and top plates 42 will begin to cool, thus cooling the unified liquid into the solid bar of soap 80. When the heating process is complete, the power light 66 will emit a green color and the lock 76 will unfasten the cover 40 from the housing 12. The solid bar of soap 80 can be stored within the dish 50 upon the exterior surface 48 of the cover 40.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A soap recycling device configured for molding a variety of soap scraps into a new bar of soap, said device comprising:
 a housing having a top surface and a bottom surface, said housing having a front surface and a back surface, said housing having an interior, said top surface of said housing having a front edge and a hack edge;
 a bottom plate being positioned on said top surface of said housing and protruding inward therefrom, said bottom plate being configured for holding a plurality of soap pieces;
 an interior surface of a cover being configured for being positioned upon said top surface of said housing, a top plate being positioned on said interior surface of said cover, an exterior surface of said cover having a dish, said dish defining a space to hold a bar of soap;
 a power source being positioned within said interior of said housing, said power source being rechargeable, said power source being in electric communication with a universal serial bus port, said universal serial bus port being positioned on said back surface of said housing;
 a button being positioned on said front surface of said housing, said button being configured for providing electric current from said power source to said bottom plate and said top plate wherein said bottom and top plates generate heat;

a cord being configured for providing electricity to said power source, said cord having a universal serial bus input, said universal serial bus input of said cord being configured for being inserted into said universal serial bus port; and a compartment being configured for storing said cord within when said cord being un-used, said compartment being positioned on said bottom surface of said housing, said compartment having a door, said door being configured for enclosing said compartment.

2. The soap recycling device of claim 1, further comprising said housing having a left surface and a right surface.

3. The soap recycling device of claim 1, further comprising said interior defining a space for a variety of elements to be positioned within.

4. The soap recycling device of claim I, further comprising a plurality of feet being positioned on said bottom surface of said housing.

5. The soap recycling device of claim 1, further comprising said bottom plate having a concave shape.

6. The soap recycling device of claim 1, further comprising a rear edge of said interior surface being coupled to said back edge of said top surface of said housing by a hinge, said hinge being configured for positioning said cover in an open and closed position.

7. The soap recycling device of claim 1, further comprising said button being an actuator.

8. The soap recycling device of claim 1, further comprising a power light being positioned proximate to said button on said front surface, said power light being in electric communication with said button, said power light being configured for emitting either a green or red color to indicate a completion status of heating the plurality of soap pieces within said bottom and top plates.

9. The soap recycling device of claim 1, further comprising a plurality of lights being in electric communication with said power source, each of said lights being configured for emitting a respective one of a red color and an orange color and a green color, said plurality of lights being configured for emitting a specific one light relative to the level of electricity within said power source.

10. The soap recycling device of claim 1, further comprising a lock being positioned on said front edge of said top surface of said housing, said locking being complementary to a latch, said latch being positioned on said interior surface of said cover, said lock being a solenoid configured to fasten to said latch when said button being in an on position, said lock being in electric communication with said button.

11. A soap recycling device configured for molding a variety of soap scraps into a new bar of soap, said device comprising:

a housing having a top surface and a bottom surface, said housing having a front surface and a back surface, said housing having a left surface and a right surface, said housing having an interior, said interior defining a space for a variety of elements to be positioned within, a plurality of feet being positioned on said bottom surface of said housing, said top surface of said housing having a front edge and a back edge;

a bottom plate being positioned on said top surface of said housing and protruding inward therefrom, said bottom plate having a concave shape, said bottom plate being configured for holding a plurality of soap pieces;

an interior surface of a cover being configured for being positioned upon said top surface of said housing, a top plate being positioned on said interior surface of said cover, a rear edge of said interior surface being coupled to said back edge of said top surface of said housing by a hinge, said hinge being configured for positioning said cover in an open and closed position, an exterior surface of said cover having a dish, said dish defining a space to hold a bar of soap;

a power source being positioned within said interior of said housing, said power source being rechargeable, said power source being in electric communication with a universal serial bus port, said universal serial bus port being positioned on said back surface of said housing;

a cord being configured for providing electricity to said power source, said cord having a universal serial bus input, said universal serial bus input of said. cord being configured for being inserted into said universal serial bus port;

a compartment being configured for storing said cord within when said cord being un-used, said compartment being positioned on said bottom surface of said housing, said compartment having a door, said door being configured for enclosing said compartment;

a button being positioned on said front surface of said housing, said button being an actuator, said button being configured for providing electric current from said power source to said bottom plate and said top plate wherein said bottom and top plates generate heat;

a power light being positioned proximate to said button on said front surface, said power light being in electric communication with said button, said power light being configured for emitting either a green or red color to indicate the completion status of heating the plurality of soap pieces within said bottom and top plates;

a plurality of lights being in electric communication with said power source, each of said lights being configured for emitting a respective one of a red color and an orange color and a green color, said plurality of lights being configured for emitting a specific one light relative to the level of electricity within said power source; and a lock being positioned on said front edge of said top surface of said housing, said locking being complementary to a latch, said latch being positioned on said interior surface of said cover, said lock being a solenoid configured to fasten to said latch when said button being in an on position, said being in electric communication with said button.

* * * * *